United States Patent [19]

Keys et al.

[11] 4,182,934
[45] Jan. 8, 1980

[54] METHOD AND APPARATUS FOR DETECTING IRREGULAR TELEPHONE CALLS

[75] Inventors: Charles T. Keys, Pataskala; Renald A. Ratti, Westerville, both of Ohio

[73] Assignee: Bell Telephone Laboratories, Incorporated, Murray Hill, N.J.

[21] Appl. No.: 945,810

[22] Filed: Sep. 26, 1978

[51] Int. Cl.² ............... H04M 15/12; H04M 1/66
[52] U.S. Cl. ..................... 179/7 R; 179/18 DA; 179/175.2 R
[58] Field of Search .............. 179/7 R, 7.1 R, 8 R, 179/8 A, 18 DA, 84 VF, 175, 175.2 R, 175.3 R, 18 FH, 27 DB

[56] References Cited

U.S. PATENT DOCUMENTS

| | | | |
|---|---|---|---|
| 3,883,702 | 5/1975 | Zarouni | 179/175.2 R |
| 3,928,803 | 12/1975 | Hugon et al. | 179/175 |
| 4,001,513 | 1/1977 | Naylor | 179/18 DA |
| 4,002,848 | 1/1977 | Stein | 179/18 DA |
| 4,046,962 | 9/1977 | Rogers | 179/18 DA |

OTHER PUBLICATIONS

"Beating the Blue Box Bandits," IEEE Spectrum, vol. 9, No. 8, Aug., 1972, pp. 52-58, Marce Eleccion.

Primary Examiner—Gerald Brigance
Attorney, Agent, or Firm—Charles H. Davis

[57] ABSTRACT

Certain telephone calls cannot be billed properly due to the failure to detect a valid answer signal from the called customer. This disclosure presents an arrangement for detecting irregular calls that are recognized initially by a momentary off-hook signal from the called end of the trunk which is not quickly followed by a release of the trunk. When a momentary off-hook signal is received, the holding time of the trunk is measured. If the holding time exceeds a predetermined threshold a record is made of the lines connected to the trunk.

The calls are also categorized by called destination to detect fraudulent calls which are frequently directed to selected destinations.

9 Claims, 10 Drawing Figures

FIG. 9

BLACK BOX FILE OR BLUE BOX FILE

| WORD | INCOMING TRUNK NUMBER | DAY | HRS | MIN | SEC |
|---|---|---|---|---|---|
| 0 | | | | | |
| 1 | | | | | |
| ⋮ | | | | | |
| N | | | | | |

FIG. 10

IRREGULAR CALL PRINTOUT

| TYPE OF CALL | DATE | | | | CALLING NUMBER | ORIGINAL DIALLED NUMBER |
|---|---|---|---|---|---|---|
| BLACK / BLUE | DAY | HRS | MIN | SEC | NNX-XXXX | NPA-NNX-XXXX |
| INCOMING TRUNK NUMBER | | | ELAPSED TIME | | | DIGITS FROM M. F. RECEIVER |
| RG | RN | TN | HRS | MIN | SEC | NPA-NNX-XXXX |

METHOD AND APPARATUS FOR DETECTING
IRREGULAR TELEPHONE CALLS

TECHNICAL FIELD

This invention relates to telephone systems and particularly to arrangements for detecting irregular calls. More specifically, this invention relates to a method and apparatus for identifying fraudulent toll calls.

BACKGROUND ART

It is generally known that telephone service is sometimes abused by persons making fraudulent calls, that is, calls that cannot be billed properly. One method of placing a fraudulent call involves the use of the so-called "blue box" device. The blue box device permits a calling party to simulate in-band supervisory signals and multifrequency tones which are normally generated by the switching equipment to direct calls through the toll network. The blue box user generally places an inexpensive toll call to a nearby destination or a call to a toll free number. At the start of ringing when the message billing equipment is waiting for an answer signal from the destination office, the caller transmits a disconnect signal to the destination toll office. In response to the signal, the destination office abandons the call in progress. The blue box user now transmits a seizure signal which is interpreted at the destination toll office as a new request for service. The destination office attaches a sender to the connection and returns a "proceed-to-send" signal to the calling party. The blue box caller can now key in a new number and direct this second call anywhere in the toll network. The message billing equipment at the originating office is unaware of the second call and charges the calling customer on the basis of the inexpensive or free call to the first number.

Attempts have been made to detect calls from a blue box user. In one known arrangement such as disclosed in U.S. Pat. No. 4,002,848 to R. F. Stein of Jan. 11, 1977, tone detectors are connected at a point in the speech path where in-band signaling and multifrequency switching and control tones normally are not present. If tones are detected at this point, it is presumed that the tones are being generated by a blue box at the calling station and a record is made of the call details for further investigation. Another known method, such as disclosed in U.S. Pat. No. 4,001,513 to D. C. Naylor of Jan. 4, 1977, recognizes the second proceed-to-send signal which occurs at the time when answer supervision is normally expected from the called customer. In this arrangement, a multifrequency receiver is coupled to the connection to record the tones transmitted by the calling customer's blue box.

While both of the above arrangements are suitable for their intended purpose, they require a multiplicity of tone receivers and apparatus to couple the receivers to the connection. Moreover, these prior art arrangements are not suitable for detecting the so-called "black box" fraud device which does not use multifrequency tones. This device permits free calls to be made to the black box user because the device returns a short off-hook signal to the calling office without establishing a charging condition on the trunk.

Thus, a need exists in the prior art for detecting irregular toll calls that may not be accompanied by tones fraudulently transmitted by the calling customer.

DESCRIPTION OF THE INVENTION

The foregoing problem is solved and a technical advance is achieved by an arrangement which automatically detects a quick disconnect signal from the called end of the trunk and compares the holding time of the trunk with a predetermined threshold time. Since most legitimate calls are readily abandoned if there is no valid answer from the called party, a record is made of those calls whose holding times exceed the threshold. The lines involved in these calls can then be further investigated to ascertain if they are using fraudulent devices.

In accordance with another feature of the invention the calls are also categorized by the called office designation, since it has been found that many blue box users direct their calls to toll free numbers.

BRIEF DESCRIPTION OF THE DRAWING

FIG. 9 shows a portion of the computer memory which is used for keeping track of potentially fraudulent calls; and FIG. 10 shows the detailed printout for calls suspected of being fraudulent.

DETAILED DESCRIPTION

Figure 1:
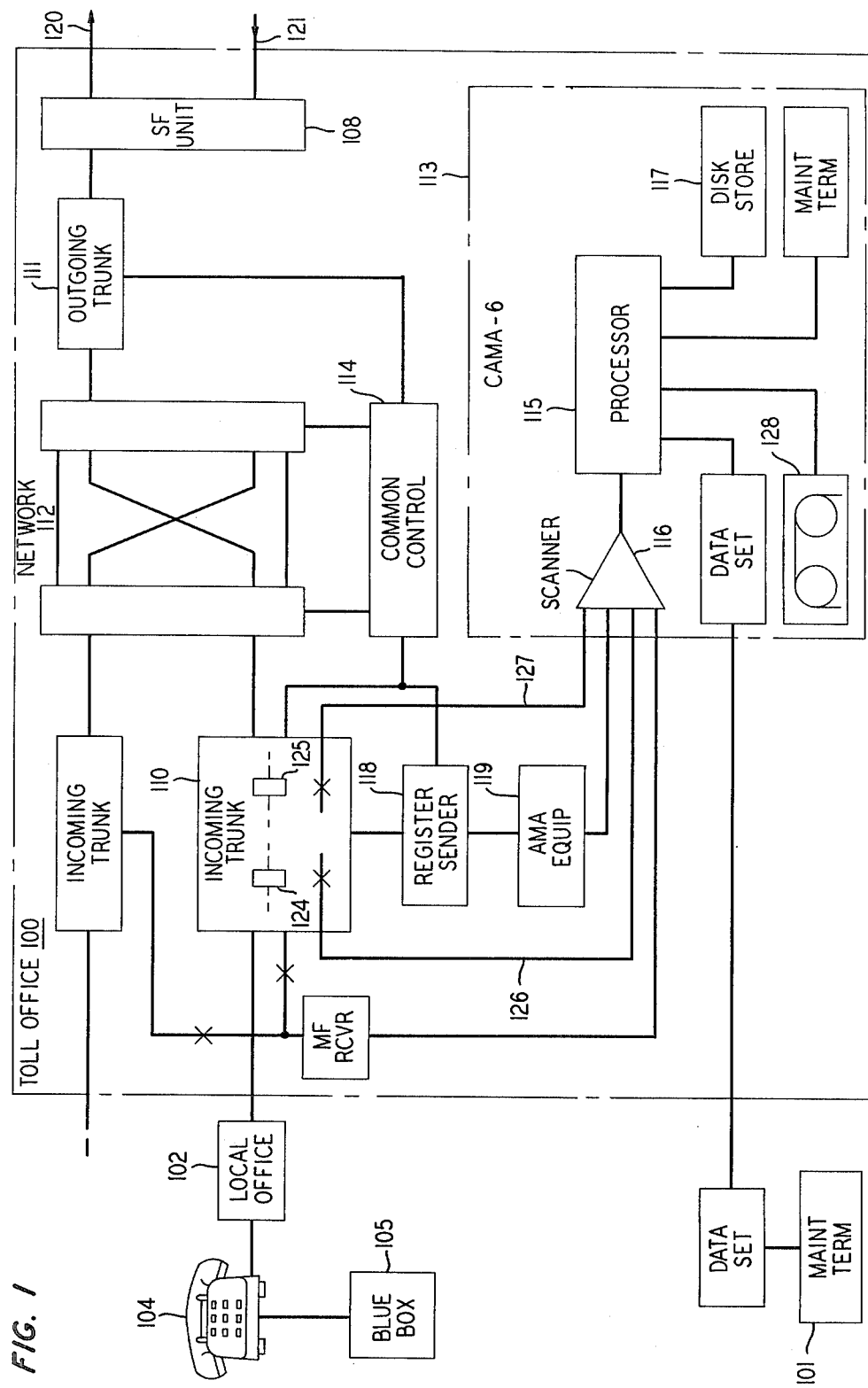
FIGS. 1 and 2, when arranged according to FIG. 3 show in block diagram form the inventive arrangement in a typical telephone switching office.
Figure 2:
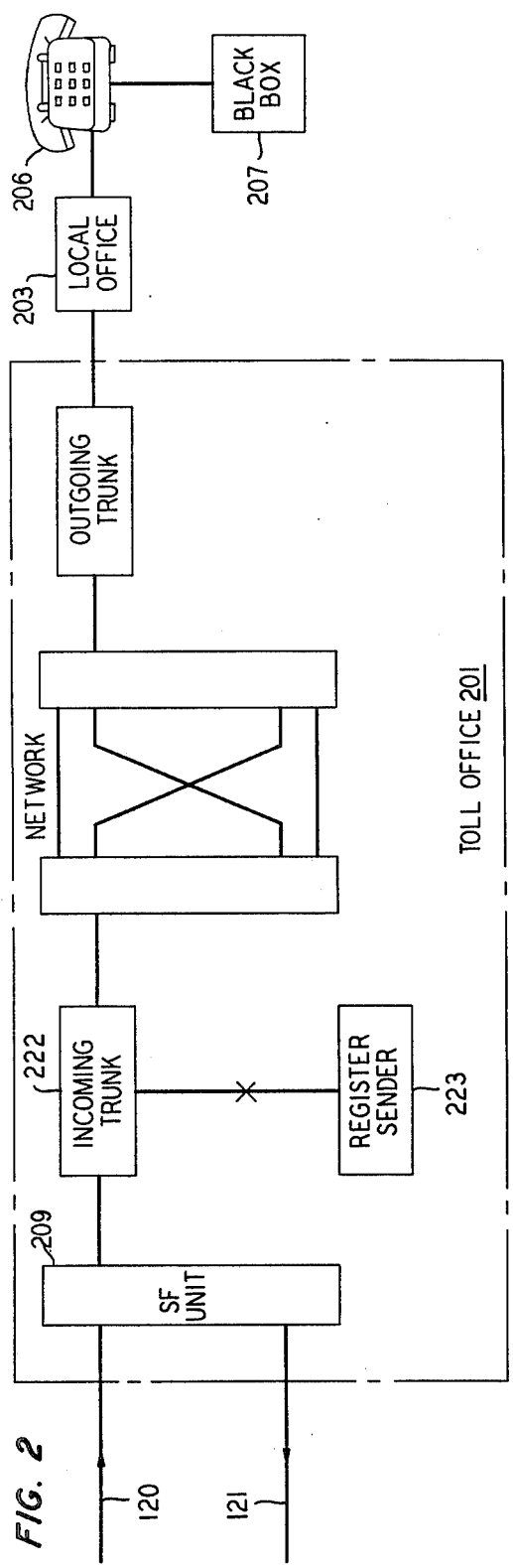
Figure 3:
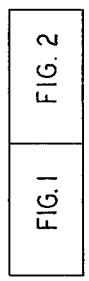

FIGS. 1 and 2, when arranged according to FIG. 3, show a portion of a typical telephone network in block diagram form. Only those portions of the system necessary for an understanding of the invention are shown and all blocks within the system are well known to persons skilled in the art.

FIG. 1 shows originating toll office 100 and FIG. 2 shows destination toll office 201. Toll office 100 serves many local switching offices, such as local office 102 and connected to local office 102 is a customer station 104. The customer at station 104 has a blue box fraud device 105 which permits the customer to originate fraudulent calls.

The circuitry of blue box 105 is well known and consists of an oscillator capable of generating the in-band single frequency supervisory signals which are generally exchanged between toll offices by the single frequency signaling units, such as 108 and 209. The blue box 105 also contains a multifrequency tone generator and push buttons permitting the user to transmit multifrequency signals and control tones normally passed between toll offices in the network by the switching equipment.

Destination toll office 201 also serves many local switching offices such as local office 203. Local office 203 is shown connected to customer station 206 which has a black box fraud device 207 coupled thereto.

As is generally well known in the art, the charging of a toll call is delayed after the initial off-hook signal is returned from the called end to assure that the off-hook signal is a valid answer and not a signal caused by noise or a momentary hit on the line. Thus, the answer signal must be present for a minimum interval, called the "charge guard" interval before it is recognized as a valid called party answer.

The black box fraud device takes advantage of the interval and does not provide the proper answer supervision that would normally cause the calling party to be billed.

The toll office 100 in FIG. 1 comprises a plurality of incoming trunks such as 110 and outgoing trunks, such as 111 which are interconnected over network 112 under the control of common control equipment 114. Toll office 100 also comprises centralized automatic message accounting equipment 113 which is used to assemble the call billing information for the surrounding local offices served by the toll office. Of course, the invention disclosed herein could also be used for automatic message accounting systems which are located at the local office.

Message accounting system 113 comprises a stored program controlled processor 115 which gathers billing data via scanner 116 and records the data on a disk storage unit 117. Processor 115 obtains the details of the call, such as the calling and called line identities, from register-sender 118 and automatic message accounting equipment 119. The calling and called supervisory states of the call are monitored by the processor directly at incoming trunk 110 via scanner 116.

The customer initiates a long distance toll call in the conventional manner by lifting his receiver at station 104 and dialing the telephone number of the desired party. If a blue box fraud call is to be made, the customer at station 104 would usually dial a nearby toll call to establish an inexpensive charging base or the customer might dial one of the toll free numbers, such as 800-ABX-XXXX or a number assigned to a free service such as a foreign area information operator. An example of such a number might be NPA-555-1212 wherein the NPA represents the foreign area code and 555 is the office designation of the directory assistance operator in the foreign area.

In the example being described, the local office 102 determines that the routing of the call should be via toll office 100 and selects trunk 110. Register-sender 118 is connected to the trunk and local office 102 outpulses the called number and the calling number into register-sender 118.

At tool office 100, common control equipment 114 examines the called number and determines that the call must be forwarded via destination toll office 201. Outgoing trunk 111 is selected in the route to office 201, and a seizure signal is forwarded via single frequency signaling units 108 and 209. The seizure signal at office 100 causes SF unit 108 to remove tone from transmission path 120 and SF unit 209 responds by putting a seizure signal on incoming trunk 222 which bids for connection to register-sender 223. When register-sender 223 is attached to the trunk, a proceed-to-send signal is returned to office 100 via transmission path 121 informing register-sender 118 at office 100 that register-sender 118 can outpulse the called number to the destination toll office 201.

As mentioned above, the message billing function for the call being described is performed at toll office 100 by AMA equipment 119 and CAMA-C equipment 113. Initial entry data, such as the calling number, called number, trunk number and miscellaneous billing information are received by processor 115 via AMA equipment 119 and scanner 116, while answer and disconnect supervisory indications are received directly from the trunk via scanner 116. Thus, all trunks are periodically scanned to determine the current state of their calling and called supervisory relays 124 and 125, respectively. The current state of these relays is compared with the state recorded on a previous scan and if a change of state occurs, appropriate action is taken.

Initial entry data and the answer time for a call are temporarily stored in a portion of disk store 117 during the conversation period of the call. Disk 117 contains memory storage locations for each trunk. Once a valid disconnect has been detected all call details are assembled in another storage location of the disk file and periodically these assembled messages are removed from the file and entered on a magnetic tape 128. This tape is delivered to an accounting center where the customer's bill is prepared.

Insofar as the message accounting function is concerned, a typical call sequence is illustrated in the flow diagram of FIGS. 4–7. When an incoming trunk is in its idle state an "idle-posted" code is stored in the trunk timetable of memory at a word location that is identified and indexed by the trunk number. When the incoming trunk is seized by the calling customer's local office, the calling supervision is detected on conductor 126 (FIG. 1) by scanner 116. The time of this off-hook transition is called the "seize time" and this time is entered in the trunk timetable by overwriting the idle posted code with the time of day.

The processor can now make an initial entry for the call and as is well known in the art, the initial entry includes the calling and called line identities, the trunk identity, the time of day and any other pertinent data necessary to bill the call to the appropriate customer. The initial entry is entered in a portion of the disk store called the "fixed file". When this occurs, the processor can replace the "seize time" in the trunk timetable with the "seize posted" code.

Figure 4:
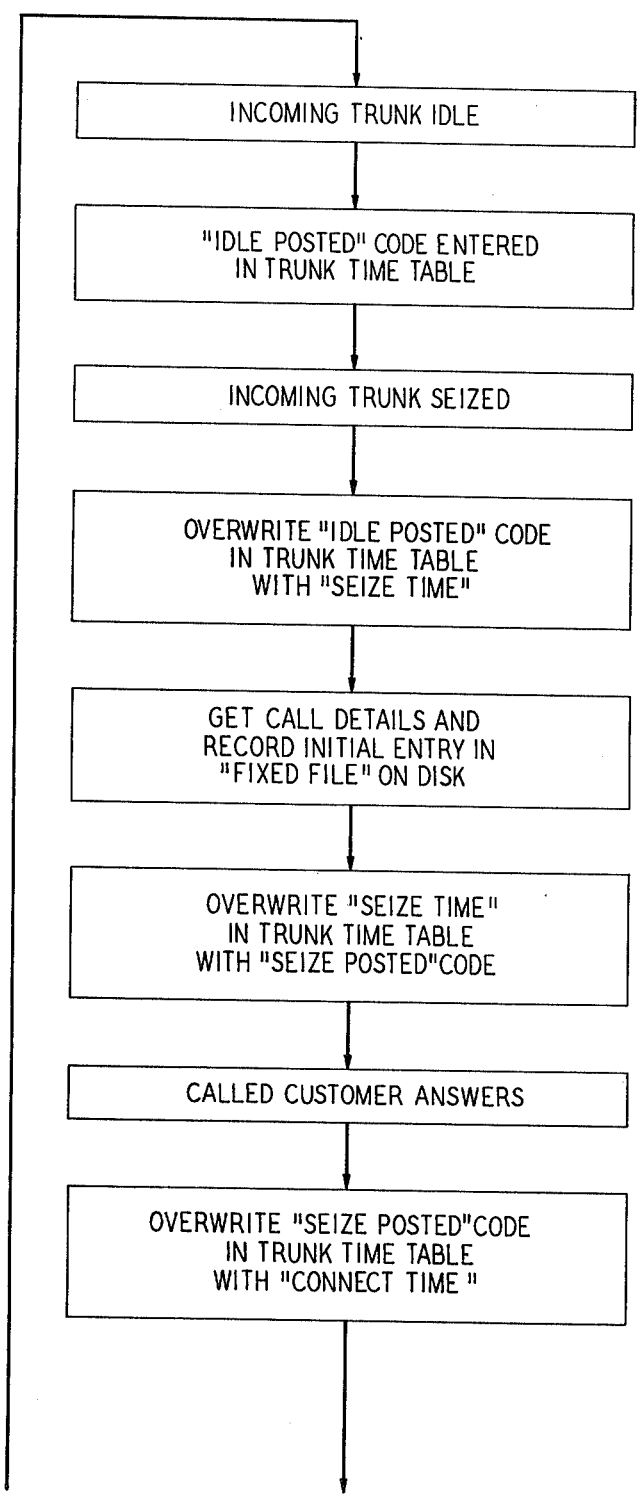
FIGS. 4 through 7 when arranged according to FIG. 8 show a typical flow chart of the processor operation when the invention is implemented by a general purpose computer at the switching office.

The call is now switched through the network to the end office serving the called customer. Ringing is transmitted to the called customer and when the customer answers, his off-hook condition is detected by a transition upon conductor 127 in FIG. 1. The trunk is now identified in the trunk timetable and the table is updated to reflect the connect time. This is accomplished by overwriting the "seize posted" code with the "connect time" as shown in FIG. 4.

Figure 5:
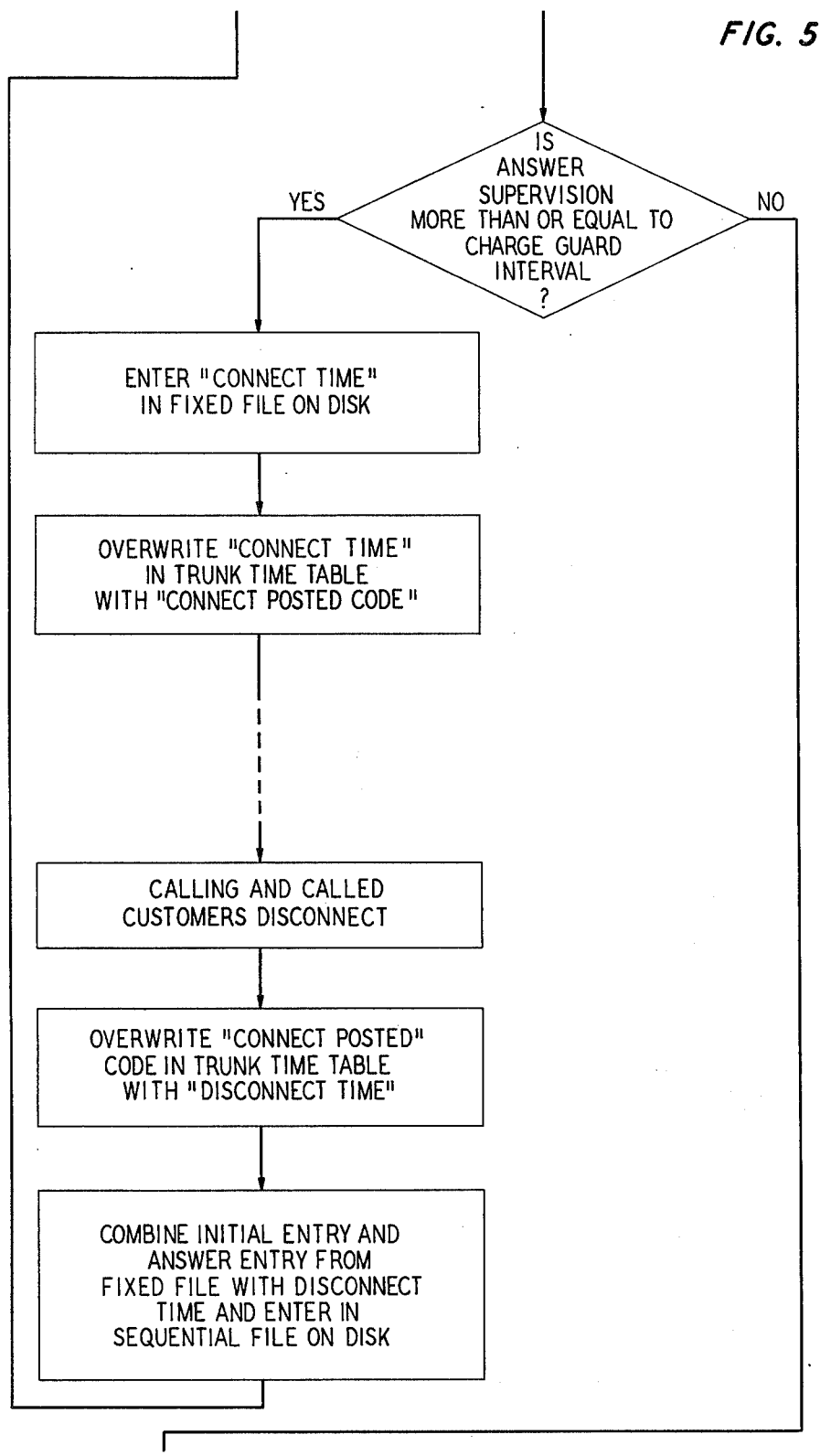
Figure 6:
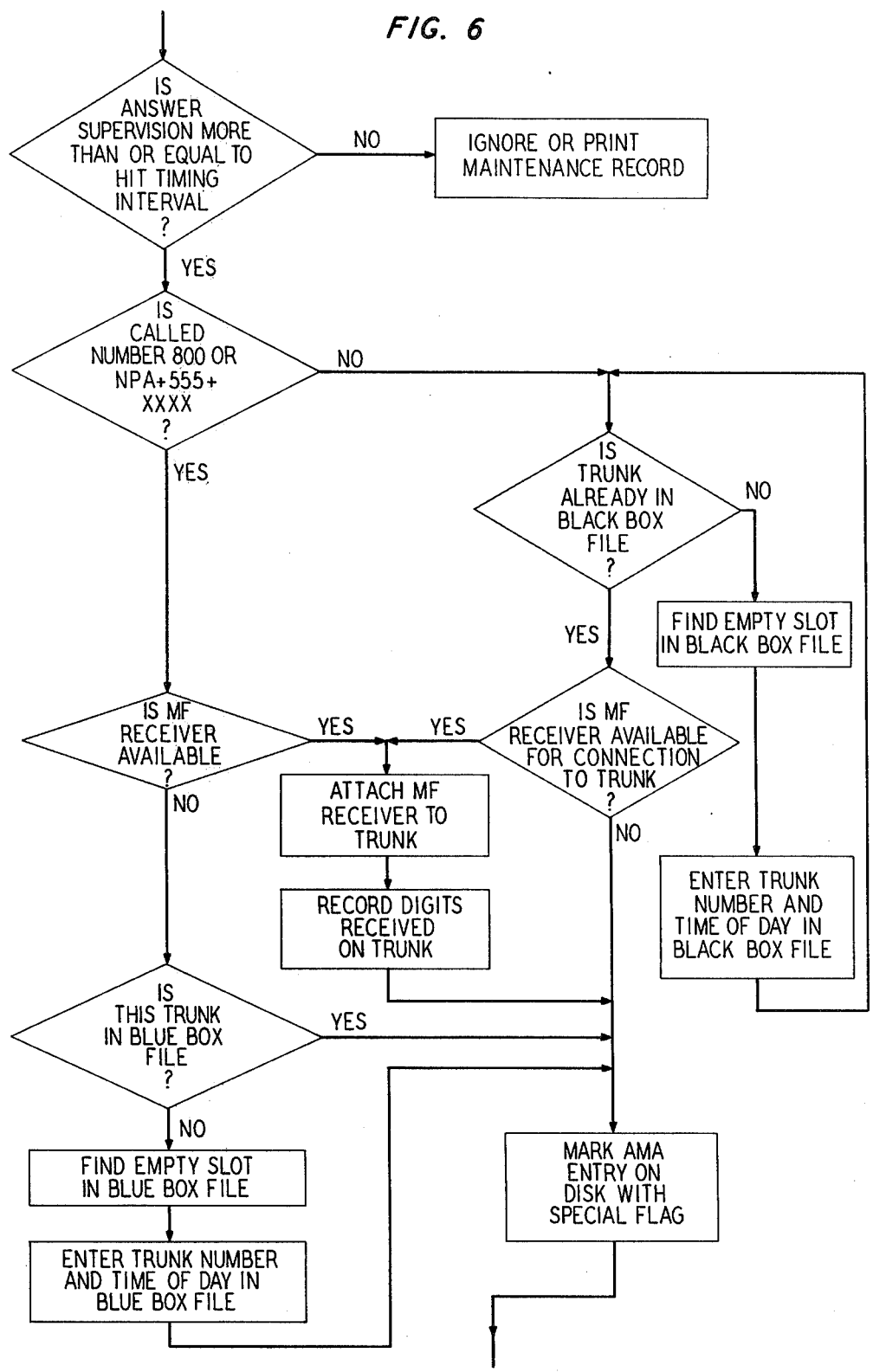
Figure 7:
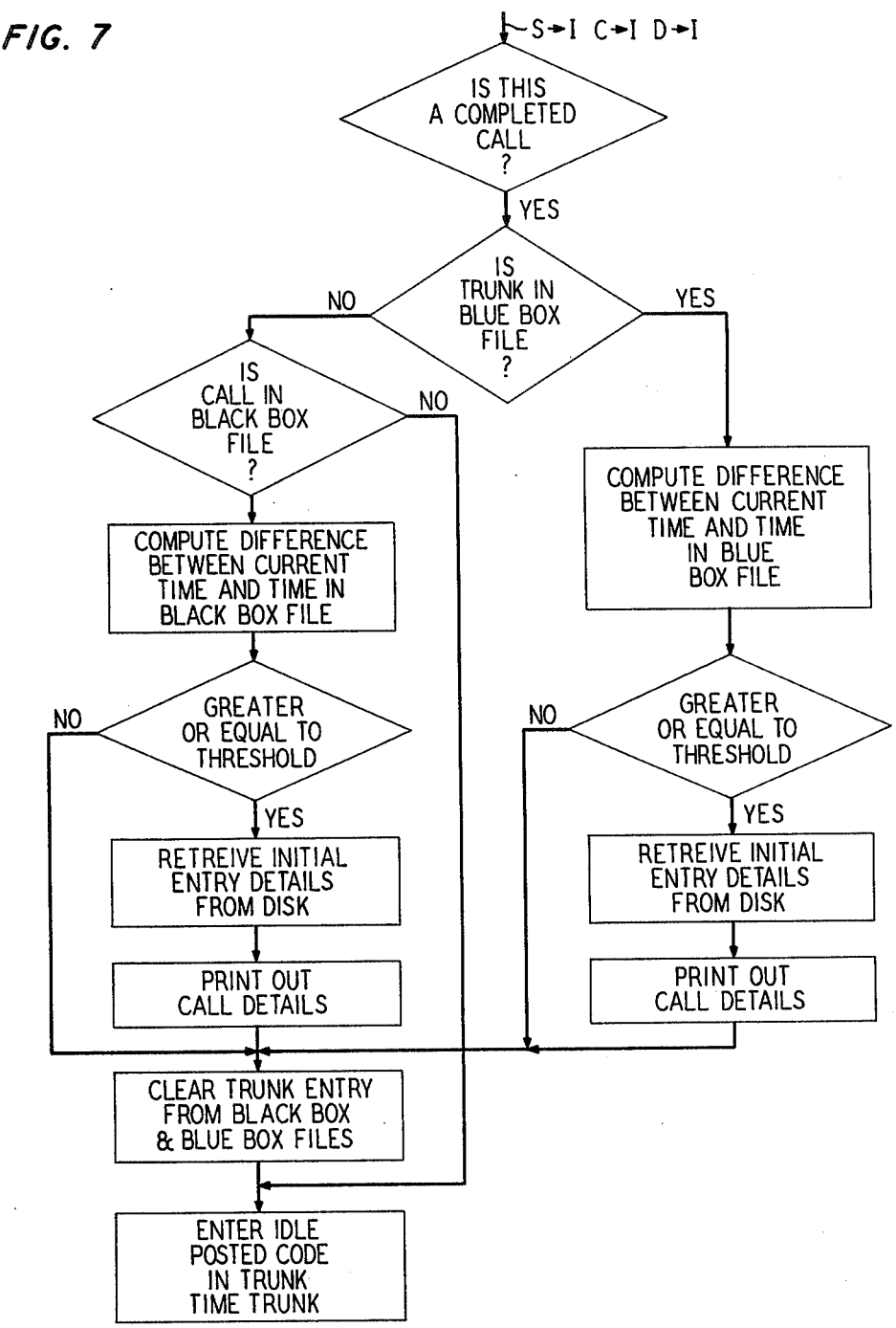

The called customer answer condition is also examined to determine if the off-hook was a hit on the line caused by some electrical disturbance or if it was a legitimate answer by the called customer. If the called off-hook condition lasts longer than the charge guard interval, it is presumed that the off-hook is a valid answer condition and the "connect time" is recorded in the fixed file where the initial entry details are already recorded. The trunk timetable is now updated as shown in FIG. 5 by overwriting the "connect time" with the new "connect posted" code. At the end of conversation and assuming that both parties hang up simultaneously, the disconnect time is recorded in the trunk timetable. The fixed file information is now read by the processor and appended to the disconnect time and written in a portion of the disk store called the "sequential file." With this latter action, the "idle posted" code is once again stored in the trunk timetable and the trunk is now idle and available for service.

If the customer at station 104 wishes to establish a fraud call using a blue box device 105, the customer activates the device as soon as he hears the ringing signal being transmitted to the called line. By activating his blue box at this time the caller transmits a disconnect tone to SF unit 209 before the called customer answers the call. SF unit 209 responds by abandoning the call and releases the connection through toll office 201 to the called customer station 206. The connection from calling station 104 to SF unit 108 remains established, nevertheless, under control of the DC supervision on this portion of the connection which is controlled by the calling station. It will be recalled from the prior description that the automatic message accounting equipment 113 has recorded an initial entry and is still waiting for called party answer supervision at this time.

The customer at station 104 now removes the disconnect tone from his line. SF unit 209 interprets this as a new request for service and bids for a register-sender such as 223. When the register-sender is attached to incoming trunk 222 and the register-sender is ready to receive the called number, a proceed-to-send signal is once again returned to toll office 100. At this time, however, register-sender 118 is not attached to trunk 110 for outpulsing and the proceed-to-send signal is transmitted directly to the calling station. The customer at station 104 can now use his blue box to key-in multifrequency control signals and thereby direct his call to a new called party. If toll office 100 is not equipped to detect blue box fraud calls, it ignores the momentary off-hook signal received by SF unit 108 when register-sender 223 was reconnected to incoming trunk 222 since this signal was too short in duration to signify a valid answer. When the telephone station of the new called number answers, however, a charging condition will be established in the trunk and an answer entry will be made by the CAMA-C equipment at toll office 100. Of course, the calling party will be charged at a rate according to the first number dialed which may have been a free call or a less expensive toll call.

In one known prior art arrangement, toll office 100 is arranged to detect the momentary off-hook signal received from the distant register-sender. If this signal, which is sometimes referred to as "short connect" or "quick disconnect" is detected, the system proceeds accordingly to the flowchart of FIG. 6. At the first indication of called answer supervision computer system 113 begins timing the duration of the off-hook signal to determine if the off-hook is a legitimate answer or a momentary hit on the line. If the off-hook is sufficiently long to indicate a valid answer, the call is billed to the calling customer as described above. If the off-hook supervisory signal is shorter than the hit timing interval, it is presumed that the off-hook signal was a result of an electrical disturbance on the line and not caused by the called customer answering or by any device used for committing fraud. For the purpose of fraud detection, this hit signal can be ignored but a record could be made for maintenance purposes. If the short connect off-hook interval is longer than the hit timing interval but shorter than usually encountered for a valid answer signal then the call is suspected of being a possible fraudulent call. The processor 115 then examines the fixed file portion of its disk store and looks up the trunk number of the incoming trunk. This file contains the initial entry, including the identities of the calling line and called destination. In accordance with a feature of the invention, the processor then compares the called destination number with a preselected list of numbers known to be frequently used for making blue box fraud calls. These may include numbers assigned to telephone services, such as directory assistance, etc., or numbers which normally cause the call to be billed to the called customer, such as the 800 series of numbers.

Assuming that the call has been directed to one of the numbers more frequently used for blue box fraud, the processor then interrogates its memory to ascertain if a multifrequency receiver is available for connection to the incoming trunk. As discussed above, some offices may not be equipped with multifrequency receivers that can be coupled to all trunks or for some reason the multifrequency receivers may already be busy on other calls.

If a multifrequency receiver is available, it is attached to the trunk and a record is made of the digits received. In addition, a special mark is made in the AMA entry indicating that this may be a blue box fraud call.

If it is assumed that a multifrequency receiver is unavailable for connection to the trunk, the processor then examines a portion of its memory designated "blue box file" to ascertain if the trunk identity has already been entered in the file. Since it has been assumed that this is a new attempt to place a fraudulent call on the trunk, there has been no prior entry in the file and the trunk identity and time of day are now entered in an empty memory slot of the blue box file. A typical example of a blue box file is shown in FIG. 9 of the drawing. At this time, the processor also places a special flag in the AMA entry associated with this call.

Now let it be assumed that the call from station 104 had been directed to a number not appearing on the list of numbers frequently used for blue box fraud calls.

In accordance with a feature of our invention, the processor can nevertheless, still identify these fraudulent calls. As set forth in the flow chart of FIG. 6, the processor examines a portion of its memory called the "black box file" to ascertain if the call has already been entered in this file. Since it has been assumed that this is a new attempt to place a fraudulent call on the trunk, the trunk identity is not found in the black box file and the processor enters the trunk number and the time of day in an empty slot in this file.

Although the call is being placed to a number that does not appear in the frequently called blue box number list, the call may still be originated by a customer having a blue box device. The processor then ascertains if there is a multifrequency receiver available for connection to the trunk and if a receiver is available, the receiver is attached to the incoming trunk as previously described.

Any digits received by the receiver are recorded in the disk file and a special flag is entered in the AMA entry indicating that this is a possible fraudulent call. If no digits are received by the receiver or if a receiver had not been available for connection to the trunk, a special mark is still placed in the AMA entry.

Up to this point the processor has detected a short connect signal on the called end of the trunk which indicates a possible fraudulent call. The processor has examined the called destination address to ascertain if the call had been placed to a number that is known to be frequently used for making fraudulent calls, and based on this screening, the processor has entered the identity of the trunk and the time of day in either the blue box file or the black box file of its memory. If a multifrequency receiver was available the processor also connected the receiver to the incoming trunk to detect tones generated by a blue box device that may be attached to the calling line.

No further action is taken on the call at this time until there is a change of state detected in the supervisory condition of the trunk. As mentioned above, processor 115 periodically monitors the supervisory condition of the trunks via scanner 116. The result of each scan is compared with the last look scan to ascertain if the trunk has changed state.

With respect to the system being described, it has been assumed that a call has been placed and a short connect signal has been detected. Under most circumstances a short connect would be followed by a disconnect since the calling party would normally abandon the call when the called party did not answer. If the call is a fraudulent call, however, the trunk might be held for a much longer interval while the calling and called party converse over the connection. In accordance with a feature of the invention, the processor is programmed to recognize when the trunk goes idle and compute the holding time as set forth in the flow diagram of FIG. 7. When a change of state occurs the processor ascertains whether the change of state resulted in a completed call. At the conclusion of the call the processor first examines the blue box file in memory to see if the trunk number had been entered in the file. If the call had not been recorded in the blue box file the black box file is examined.

Regardless of which file the call had been entered into the file contains the trunk identity and the time of day that the entry was made. By subtracting the recorded time from the current time the processor can compute the trunk holding time. The holding time is then compared to a preselected threshold and if the holding time exceeds the threshold a record is made of that call. No record is made for any calls whose holding times do not exceed this threshold since these calls are presumed to be legitimate unanswered calls that have been abandoned by the calling customer.

Having determined that the holding time of the trunk exceeded the threshold, the processor retrieves the initial entry data from the disk store and prints out the call details at maintenance terminal 101. The processor then clears the trunk entry from the blue box or black box file and enters the idle posted code in the trunk timetable. The trunk is now available to serve other calls.

As shown in FIG. 10 the call details that are printed out include the calling number, the original dialed number, the incoming trunk number, the time of day and the elapsed time of the call. If a multifrequency receiver had received digits from a blue box device, this information would also be printed out with the call details. This data can be sorted to ascertain which lines are frequently involved in fraudulent calls and a further investigation of those lines can be made to ascertain if unauthorized devices are attached to the lines.

We claim:
1. A method of identifying fraudulent calls in a telephone system wherein a potentially fraudulent call on a trunk is detected by a momentary off-hook signal from the called end of the trunk CHARACTERIZED BY the steps of:
comparing the holding time of trunks experiencing momentary off-hook conditions with a predetermined threshold time, and
recording the identity of lines connected to those trunks whose holding time exceeds the threshold.

2. The method set forth in claim 1 further including the step of recording the identity of the lines according to the destination of the calls.

3. A method of identifying fraudulent calls in a telephone system wherein a potentially fraudulent call on a trunk is detected by a short-connect signal from the called end of the trunk CHARACTERIZED BY the steps of:
registering the time that a short-connect signal occurred on a particular trunk,
determining the time that the particular trunk was restored to idle,
computing the holding time interval between the time of the short-connect signal and the restored to normal time for the particular trunk,
comparing the trunk holding time with a predetermined threshold, and
recording the call data for those trunks whose holding time exceeds the threshold.

4. The method according to claim 3 wherein the recording of call data includes the step of recording the trunk identity and the identity of at least one line connected to the identified trunk.

5. The method according to claim 4 wherein the recording of call data also comprises the step of grouping the data according to preselected called designations.

6. A method of identifying irregular calls in a telephone system wherein an irregular call is detected by a short connect signal from the called end of the trunk CHARACTERIZED BY the steps of:
identifying the trunks experiencing a short connect,
ascertaining the called destination for each trunk experiencing a short connect,
comparing the called destination with a predetermined list of numbers that previously have been used for fraudulent calls,
entering the identified trunk number and the time of connection to the trunk in a memory file according to the destination of the call on the trunk,
monitoring the trunk for a disconnect signal and recording the time thereof,
calculating the holding time of the trunk by subtracting the connect time from the disconnect time,
comparing the holding time to a predetermined threshold, and
recording the calling and called line numbers for all trunks whose holding times exceed the threshold.

7. An arrangement for identifying irregular calls in a telephone system comprising:
a plurality of trunks,
means for detecting a momentary off-hook signal on the called end of a particular one of said trunks,
means for measuring the holding time of the particular trunk experiencing said momentary off-hook signal, and
means effective when said holding time exceeds a predetermined threshold for recording the identity of lines connected to said particular trunk.

8. In a telephone switching office a plurality of trunks,
means for scanning said trunks to detect a momentary off-hook signal on the called end of one of said trunks,
means for ascertaining the time said one trunk was occupied prior to returning to idle after said momentary off-hook signal, means for comparing said occupancy time with a preselected threshold time, and means effective when said occupancy time exceeds said threshold time for recording the identity of a line connected to said one trunk.

9. The invention defined in claim 8 wherein said scanning means includes means for determining the destination of calls extended over said trunks and means for recording the identity of trunks experiencing said momentary off-hook signal in accordance with said destination.

* * * * *